(12) United States Patent
Meacham et al.

(10) Patent No.: US 8,234,252 B2
(45) Date of Patent: Jul. 31, 2012

(54) AUTOMATED TRACKING AND REPORTING OF TRADER POSITIONS

(75) Inventors: Paul Meacham, Tinley Park, IL (US);
Raymond V. Menghi, Dyer, IN (US);
James P. Moran, Hinsdale, IL (US);
Eric S. Wolff, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 578 days.

(21) Appl. No.: 11/607,841

(22) Filed: Dec. 1, 2006

(65) Prior Publication Data
US 2008/0133620 A1   Jun. 5, 2008

(51) Int. Cl.
*G06F 17/30* (2006.01)
*G06F 17/24* (2006.01)

(52) U.S. Cl. .......................................... 707/668; 709/201
(58) Field of Classification Search .................. 707/200, 707/668; 715/506; 709/201
See application file for complete search history.

(56) References Cited

U.S. PATENT DOCUMENTS

| | | | | |
|---|---|---|---|---|
| 6,460,069 B1* | 10/2002 | Berlin et al. | .................. | 709/201 |
| 7,330,871 B2* | 2/2008 | Barber | .......................... | 709/201 |
| 2002/0080158 A1* | 6/2002 | Storfer et al. | ................. | 345/700 |
| 2002/0161772 A1* | 10/2002 | Bergelson et al. | ............. | 707/100 |
| 2002/0178102 A1* | 11/2002 | Scheinberg et al. | ............ | 705/37 |
| 2004/0015523 A1* | 1/2004 | Guest et al. | .................... | 707/204 |
| 2005/0210263 A1* | 9/2005 | Levas et al. | .................... | 713/182 |
| 2006/0026500 A1* | 2/2006 | Qa 'Im-maqami | ........... | 715/506 |

* cited by examiner

*Primary Examiner* — Fred I Ehichioya
*Assistant Examiner* — Sabana Rahman
(74) *Attorney, Agent, or Firm* — Brinks Hofer Gilson & Lione

(57) ABSTRACT

A data collection application includes a collection document having a first code portion configured to format the document, at least one information input configured to receive an input wherein the at least one information input is defined by the first code portion, and a second code portion stored within the collection document and configured to include the information provided via the at least one information input. The data collection document further includes an archival routine configured to create a second collection document based on the second code portion and the information provided via the at least one information input.

10 Claims, 3 Drawing Sheets

Fig. 1

Commodity Futures Trading Commission
Identification of "Special Accounts"

OMB No. 3038-0009

| For Administrative Use Only | |
|---|---|
| Trader Code: | Firm Code: |

NOTICE: Failure to file a report required by the Commodity Exchange Act and the regulations thereunder, or the filing of a false or fraudulent report, may be a basis for administrative action under 7 U.S.C. Section 9, and may be punishable by fine or imprisonment, or both, under 7 U.S.C. Section 13 or 18 U.S.C. Section 1001.

INSTRUCTIONS TO FUTURES COMMISSION MERCHANTS, CLEARING MEMBERS, AND FOREIGN BROKERS

Assign a reporting number to each special account when it is reportable for the first time in futures or options. If an account has been assigned a number for reporting in futures (options), use the same number for reporting options (futures). Such reporting number must not be changed or assigned to any other special account without prior approval of the Commodity Futures Trading Commission. For a futures and/or option account, transmit the form to the Commission.

SECTION 1

PLEASE TYPE OR PRINT

1. Check one of "a," "b," or "c" for the special account and give identifying information as directed below:

a. ☐ House omnibus or ☐ Customer omnibus account of a futures commission merchant, clearing member, or foreign broker. Report the information in "d" below for that firm. In addition, complete items 6 through 11.

b. ☐ Account(s) owned and controlled by the same person or legal entity, such as a corporation or partnership (or controlled by an employee or officer of the entity). Report the information in "d" below for the person or other legal entity who owns and controls the account(s). In addition, complete items 2 and 4 through 11.

c. ☐ Account(s) controlled by an advisor or legal entity who is independent of the account owner. Report the information in "d" below for the advisor or legal entity controlling the special account. In addition, complete items 3 through 11.

d. Name: _____ Reporting Number: _____
      (If Individual, Last, First, Middle Initial)

Street: _____ Business Phone: _____

City: _____ State/Country: _____ Zip/Postal Code: _____

If Individual, Employer _____ Job Title: _____

If "b" or "c" is checked, is the above-identified person or legal entity registered as a:

| | | |
   |---|---|---|
   | Commodity trading advisor | ☐ Yes | ☐ No |
   | Securities investment advisor | ☐ Yes | ☐ No |

If this special account is reported in the name of a business, such as a corporation, give the name of an officer or employee to contact.

Name: _____ Job Title: _____
   (Last, First, Middle Initial)

2. If item 1.b is checked, complete the following:

a. Check as many as apply to the legal entity identified in 1.d above.

☐ Individual     ☐ Trust        ☐ Partnership                    ☐ Joint
      ☐ Sole Proprietorship   ☐ Corporation  ☐ Limited Liability Corporation
      ☐ Other (Specify) _____ c. Principal business or occupation: _____

SECTION 2

Fig. 1A 2. c. Report on an attachment all account numbers and account names included in this special account, if different than identified in 1.d above.

d. Report all persons or entities not identified in 1.d above who have a 10 percent or more financial interest in this special account, including limited partners, indicating with an asterisk those having discretionary trading authority with respect to this account. If none, write "none." Use a continuation sheet, if necessary.

Name: _____
   Last, First, Middle Initial

Location: _____
   City and State or Country e. Report all persons other than those above who control the trading of accounts included in the special account. Use a continuation sheet, if necessary. If there are more than five such persons, show "multiple controllers" in the space below.

Name: _____
   Last, First, Middle Initial

Location: _____
   City and State or Country

SECTION 3

3. Controlled Accounts. If you checked item 1.c, complete "a" or "b" below.

a. If ten or more accounts are controlled by the advisor, check this box. ☐ b. If fewer than ten accounts are controlled by the advisor, on an attachment provide for each account the account number and names and locations of persons having a ten percent or more financial interest in the account.

NOTE: Exchanges using this form may require the following information:

a. If ten or more accounts are controlled by the advisor, provide the account number and name of each pool controlled by the advisor, and the name and location of the commodity pool operator.

b. If fewer than ten accounts are controlled by the advisor, for each account provide the account number and name and location(s) of person(s) having a ten percent or more financial interest in the account. For commodity pools, provide the account number, the name of the pool, and the name and location of the commodity pool operator.

SECTION 4

4. Are trades and positions in this special account usually associated with commercial activity of the account owner in related cash commodities (i.e., positions considered as hedging in futures or options)? ☐ Yes ☐ No If yes, list those specific futures or option markets in which the trader hedges. Use a continuation sheet, if necessary.

_____ _____ _____ _____ _____ _____ _____ _____

5. Name, location, and business phone number of the account executive handling the account. (If account executive is in a foreign country, list country and city.)

Name: _____ Business Phone: _____
   Last, First, Middle Initial

Location: _____
   City and State or Country

SECTION 5

| 6. Firm Name and Address: | 7. Name (Print) | |
| --- | --- | --- |
| | 8. Title: | |
| | 9. Business Phone: | 10. Date: |
| | 11. Signature: | |

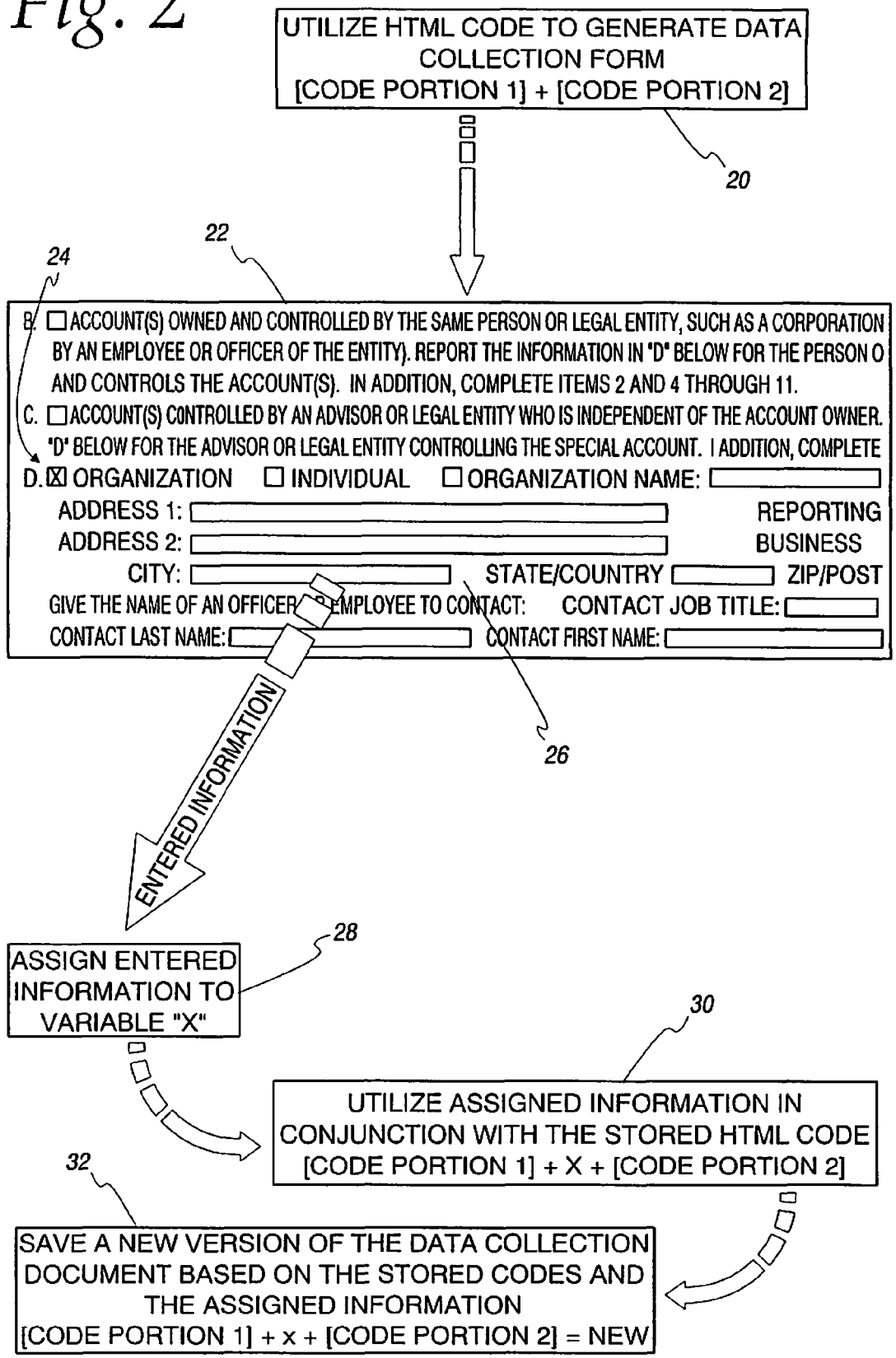

AUTOMATED TRACKING AND REPORTING OF TRADER POSITIONS

CROSS REFERENCE TO RELATED APPLICATIONS

This patent is not related to and does not incorporate the disclosure of another pending U.S. patent application or now-issued U.S. patent.

PRIORITY CLAIM

This patent does not claim the priority benefit of another pending U.S. patent application or now-issued U.S. patent.

TECHNICAL FIELD

This patent generally relates to the regulation and reporting of futures markets. In particular, this patent relates to a method and product for the tracking and reporting of future positions in accordance with federal regulations.

BACKGROUND

The Commodity Futures Trading Commission (Commission or CFTC) was established to protect market users and the public from fraud, manipulation, and abusive practices related to the sale of commodity and financial futures and options, and to foster open, competitive, and financially sound futures and option markets. The CFTC requires futures commission merchants, clearing members, and foreign brokers (collectively called "reporting firms") to report futures and trading position information on behalf of the special accounts carried on their books that meet pre-defined reporting level criteria. The futures commission merchants, clearing members, and foreign brokers are required to report to the CFTC position information of the largest futures and options traders and provide certain identifying information for the traders themselves. The reporting levels and/or criteria are established to ensure that the CFTC receives adequate information to carry out its market surveillance programs and, in turn, detect and to prevent market congestion and price manipulation and enforce speculative position limits.

The futures commission merchants, clearing members, and foreign brokers are required to complete and transmit a CFTC Form 102, titled "Commodities Futures Trading Commission Identification of 'Special Account.'" Special accounts are simply identified as any commodity futures or options account in which there is a reportable position in accordance with the CFTC's guidelines and regulations. The Form 102 provides a standardized reporting format that allows the futures commission merchants, clearing members, and foreign brokers to list and provides the required information to both the CFTC and the applicable exchanges.

Reporting the required information includes filling out a Form 102 and/or attachment to a Form 102 for each trader, client, etc., for which a position must be reported. The completed form is then transmitted, typically via facsimile, to the CFTC and/or applicable exchange for transcription and entrance in to the appropriate tracking and/or monitoring system. The reporting process is time-consuming and error prone, however the desirability of maintaining a hard-copy, i.e., a paper trail, has outweighed the convenience of simply maintaining and transmitting the information electronically.

It would be desirable to provide a product and method of reporting the required information that addresses these shortcomings. Moreover, it would be desirable to automate the reporting process to increase efficiency and accuracy. Additional features and advantages of the present invention are described in, and will be apparent from, the following Detailed Description of the Invention and the figures.

BRIEF DESCRIPTION OF THE FIGURES

FIGS. 1 and 1A illustrate an exemplary CFTC Form 102 reporting form; and FIG. 2 depicts the information flow of an automated tracking and reporting system arranged in accordance with the teaching of the present disclosure.

DETAILED DESCRIPTION

The disclosed automated tracking and reporting product and process may be utilized to regeneratively record, report and provide information to the CFTC and applicable exchanges. Moreover, the disclosed automated tracking and reporting product and process provides for electronically storing and communicating the required information and creating archival or saved hard copies for confirmation of the same.

FIGS. 1 and 1A illustrate the first and second sheets of an exemplary Form 102 identification form that may be provided to the CFTC. As previously discussed, CFTC regulations require that a Form 102, i.e., an account identification form, must be filed with the CFTC to identify each reportable account. The form generally must typically be submitted within three (3) business days of the account first establishing a reportable position. Therefore the ease and efficiency of the reporting process is of interest and importance. Upon completion, the Form 102 must be filed directly with the CFTC with a copy sent to the exchange at which the reportable position exists.

FIGS. 1 and 1A include four (4) sections of information that identify the account(s) or the special account(s) that must be reported. For example, in section 1 of the exemplary Form 102, the owner or controller of the account is identified. If applicable the location of the individual, business or firm that controls the account, along with the reporting number and contact information may be provided. Section 2 includes additional information related to the type of legal entity that controls the account(s). For example, the legal entity may be: (i) an individual, (ii) a sole proprietorship, (iii) a trust, (iv) a corporation, (v) a partnership, (vi) a limited liability corporation, (vii) joint, etc. Account numbers, routing information, majority and influential traders or shareholders can further be defined in section 2. Section 3 identifies the number of accounts controlled by an advisor, trader or shareholder. Section 4 identifies whether the reported positions are being held to offset or hedge positions the advisor, etc. has taken in a related cash commodity. Finally, section 5 identified the location and contact information of the account executive managing and/or handling the account. It will be understood that additional or different information may be required or provided based on the reporting requirements established by the CFTC and any other regulatory or information gathering entity.

In an embodiment, an automated, regenerative application or document that facilitates the recording, tracking and communicating information concerning trader's positions is disclosed. The application may be used to collect the information necessary to complete the Form 102, or alternatively may be used to collect additional information or adapted to store, compile and collect other information. Moreover, this application may be utilized to encode, and transmit the compiled information for secure transmission to a desired receiving entity.

The disclosed application is a self-contained and/or stand-alone application that can be executed on a variety of computing platforms and operating systems such as, for example, LINUX and MICROSOFT® WINDOWS®. In order to achieve such interoperability, the application could be individually tailored or written in operating system specific programming languages, or could, alternatively, be written in a language such as hypertext markup language (HTML). By writing application or document in HTML, the application can be executed and/or utilized on any system or device having a web browser such as, for example, MICROSOFT® INTERNET EXPLORER®. Moreover, the disclosed application may be designed to be a stand-alone application that does not require an additional communication connection or link, e.g., to the internet, intranet or other web-based service, to operate. The displaced application may simply be a self-contained program utilizes HTML and/or other programming languages to create a copy of itself without sending any information or requests to a program or server outside of the web browser or outside of the host computer upon which the web browser is executing.

In an embodiment, HTML is utilized to design and format an electronic version of the CFTC's Form 102, generally identified as a data collection document or form, see block 20. The data collection document is designed utilizing HMTL formatting and functionality to closely resemble the original paper or hardcopy document it is intended to replace and/or supplement. As shown at block 22, the look and feel of the hard copy document illustrated in FIGS. 1 and 1A can be recreated to simplify the transition to the new electronically formatted data collection document. In addition to resembling the original document, the new electronic data collection document can include functionality and options that can augment and improve the user's data reporting experience and efficiency. For example, the data collection document could prompt the user with predefined selections or answers for common information queries. The data collection document can adapt and/or change the status of interactive elements, e.g., checkboxes, text boxes, lists, buttons, etc., based on user selections. For example, because the check box indicated by the reference numeral 24 is selected the text box identified as "Organization Name" may be made active. In other embodiments, the document can store previous answers or data to reduce or eliminate the need for repetitive data entry. In yet other embodiments, the document can be coded or programmed to allow additional information, appendices and attachments to be quickly and easily attached to the original data collection document.

As discussed above, the data collection document may be coded in HTML to resemble a desired form. The coded document is self-contained and designed to include code or executable instructions that are stored in two places within the document. One copy of the code is placed in memory, for example, in an array, and the other copy of the code is active and utilized to run or produce the data collection document and its associated functionality (see block 20). One of the advantages to this configuration is that it eliminates the need for external JAVASCRIPT® or executable files that are commonly utilized to provide functionality to HTML documents or programs. Moreover, because the data collection document contains two copies (one executable copy and one stored copy) of the code or instructions necessary to generate and interact with the document or program, the program is regenerative and self-contained. This configuration simplifies the installation, maintenance and overall usability of the data collection document. And allows the same application or document to be used and reused to simplify the reporting process.

In operation, the user selects and opens, e.g., double clicks in a graphical environment, on the icon representative of the application or data collection document for which information is to be entered and reported. The data collection document, which is associated with the systems web browser application, e.g., MOZILLA® FIREFOX®, spawns or initiates a browser session that, in turn, displays the HTML formatted data collection document as shown in block 22.

Information may be entered, for example, into the "City" text box 26. At a block 28, the entered information, for example, "Chicago", can be assigned to a variable, "X". The assigned information "X" can, in turn, be a portion of the code that is stored, for example, in an array, as shown in block 30.

When all of the information necessary or required for complete reporting has been entered in to the data collection document and assigned to variable, the document can be printed, exported or saved to retain the changes or information. For example, at a block 32, the user may elect to save the data collection document and the provided information, and may be prompted to enter a filename. The user may or may not give the original file name to overwrite the original data collection document. After a file name is provided the application or program initiates a new browser session or window. The application or document then reads the code stored within the array from the original document, i.e., in this example, the data collection document shown in block 22, and copies it to a new array established within the document associated with the new browser window or session. The application or programs then reads the code stored within the array again, and writes out the working functions, including the assigned information "X" and the stored code, into the document associated with the new browser window or session. In this way, the assigned information provided or entered into the original data collection document is copied and integrated into a new version of the data collection document. The original version of the data collection document may then be wiped clean of any code or provided information and the user may be prompted to delete or remove the original file (not shown).

The new version of the data collection document may, either before or after the archive or save operation has been completed, be communicated to the appropriate party for recordation. For example, the formatted HTML data collection document may be printed and transmitted via postal service or facsimile for recordation by the agency, commission or exchange. Alternatively, the data collection document may be transmitted in an electronic format to a recipient via email, etc., and may, in turn, be entered directly into an electronic database.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A data collection system for collecting position data and performing market surveillance, the data collection system comprising:
 a computer processor;

a computer memory in communication with the computer processor, the computer memory configured to store a first collection document executable by the computer processor, the first collection document comprises:
  a first code portion, the first code portion configured to format the first collection document, wherein first collection document is a hypertext markup language document in a first browser session;
  at least one first information input configured to receive an input including a first reportable position of a trading account and user information, the at least one first information input defined by the first code portion;
  a second code portion, the second code portion stored within the first collection document and configured to include the user information provided via the at least one first information input, wherein the second code portion is a copy of the first code portion such that the second code portion is configured to format a second collection document in a second browser session based as a copy of the first collection document; and
  an archival routine configured to create the second collection document based on the second code portion and the user information provided via the at least one first information input, wherein the second collection document includes at least one second information input configured to receive an input including a second reportable position of the trading account,
  wherein information from first collection document is removed after the second collection document has been created, and the second code portion is stored within an array established within the first collection document.

2. The system of claim 1 further comprising:
a communications routine configured to communicate the second collection document in response to a communications request.

3. The system of claim 2, wherein the communications routine is selected from the group consisting of: a printing application, an electronic mail application and a facsimile application.

4. The system of claim 1 wherein the at least one first information input comprises a plurality of inputs.

5. The system of claim 4 wherein one of the plurality of inputs is configured to receive an identification of whether the first reportable position hedges a commodity position.

6. The system of claim 4 wherein one of the plurality of inputs is configured to receive an identification of whether the first reportable position hedges the second reportable position.

7. The system of claim 4 wherein one of the plurality of inputs is configured to receive a number of accounts associated with an entity in control of the trading account.

8. A method of data collection comprising:
creating a first collection document, the first collection document including:
  providing a first code portion configured to format the first collection document as a hypertext markup language document in a first browser session;
  receiving an input via an at least one first information input defined by the first code portion, wherein the input includes a first reportable position of a trading account and user information;
  storing a copy of the first code portion as a second code portion within an array established in the first collection document of the first browser session, wherein the second code portion is configured to include the information provided via the at least one first information input and wherein the second code portion is configured to format a second collection document such that the second code document is a copy of the first code document; and
configuring an archival routine to create the second collection document as a second browser session based on the second code portion and the information provided via the at least one first information input, wherein the second collection document includes at least one second information input,
removing the information from the first collection document after the second collection document has been created.

9. The method of claim 8 further comprising:
communicating the second collection document in response to a communications request.

10. The method of claim 9, wherein
communicating the second collection document includes communicating the document via an electronic mail application.

* * * * *